(12) United States Patent
Sommer

(10) Patent No.: US 10,639,973 B2
(45) Date of Patent: May 5, 2020

(54) ARRANGEMENT FOR A VEHICLE ROOF, VEHICLE ROOF FOR A MOTOR VEHICLE, AND MOTOR VEHICLE

(71) Applicant: Webasto SE, Stockdorf (DE)

(72) Inventor: Ulrich Sommer, München (DE)

(73) Assignee: WEBASTO SE, Stockdorf (DE)

( * ) Notice: Subject to any disclaimer, the term of this patent is extended or adjusted under 35 U.S.C. 154(b) by 0 days.

(21) Appl. No.: 16/103,371

(22) Filed: Aug. 14, 2018

(65) Prior Publication Data

US 2019/0061492 A1 Feb. 28, 2019

(30) Foreign Application Priority Data

Aug. 24, 2017 (DE) .................. 10 2017 119 329

(51) Int. Cl.
*B60R 21/08* (2006.01)
*B60R 21/06* (2006.01)
*B60J 7/00* (2006.01)

(52) U.S. Cl.
CPC ............. *B60J 7/0015* (2013.01); *B60R 21/06* (2013.01); *B60R 21/08* (2013.01)

(58) Field of Classification Search
CPC .................................................... B60J 7/0015
USPC ............................. 296/214, 215, 216.01, 223
See application file for complete search history.

(56) References Cited

U.S. PATENT DOCUMENTS

| | | | |
|---|---|---|---|
| 5,167,296 A * | 12/1992 | Schreier | B60J 1/12 180/281 |
| 5,707,075 A | 1/1998 | Kraft et al. | |
| 5,775,726 A | 7/1998 | Timothy et al. | |
| 6,189,960 B1 | 2/2001 | Mumura et al. | |
| 6,283,543 B1 * | 9/2001 | Hahn | B60J 7/0573 296/223 |
| 6,520,572 B1 | 2/2003 | Niederman et al. | |
| 6,783,174 B2 | 8/2004 | Bohm et al. | |
| 6,793,277 B2 | 9/2004 | Chon et al. | |
| 7,114,769 B2 * | 10/2006 | Storc | B60J 1/183 296/219 |
| 7,393,047 B2 | 7/2008 | Hirotani et al. | |
| 8,459,696 B2 | 6/2013 | Browne et al. | |

(Continued)

FOREIGN PATENT DOCUMENTS

| | | |
|---|---|---|
| DE | 4137749 A1 | 5/1993 |
| DE | 19803164 A1 | 7/1999 |

(Continued)

*Primary Examiner* — Dennis H Pedder

(74) *Attorney, Agent, or Firm* — Fitch, Even, Tabin & Flannery, LLP

(57) ABSTRACT

An arrangement for a vehicle roof may have a roof element coupleable to a roof body of a motor vehicle and permits a view through the vehicle roof, and a safety device which is assigned to the roof element and which has a safety element and a drive means which is configured to move the safety element relative to the roof body and to transfer same from a first, retracted state, in which the safety element is stowed in a predetermined manner, into a second, extended state, in which the safety element covers a surface portion on a lower side of the roof element in a predetermined manner and opposes penetration of a body through the roof element. The safety device is designed as a darkening device and the safety element is designed as a darkening element, to selectively darken a vehicle interior of the motor vehicle.

9 Claims, 3 Drawing Sheets

(56) References Cited

U.S. PATENT DOCUMENTS

| | | | |
|---|---|---|---|
| 8,807,646 | B2 | 8/2014 | Grimm et al. |
| 9,610,915 | B2 * | 4/2017 | Specht .................. B60R 21/214 |
| 9,771,048 | B2 | 9/2017 | Min et al. |
| 10,399,527 | B2 | 9/2019 | Schutt et al. |
| 10,427,637 | B2 | 10/2019 | Raikar et al. |
| 10,449,923 | B2 | 10/2019 | Son et al. |
| 2017/0015269 | A1 * | 1/2017 | Min ..................... B60R 21/214 |
| 2017/0267199 | A1 | 9/2017 | Schütt et al. |
| 2018/0162207 | A1 | 6/2018 | Pike et al. |
| 2019/0061492 | A1 | 2/2019 | Sommer |

FOREIGN PATENT DOCUMENTS

| | | | |
|---|---|---|---|
| DE | 19853479 | A1 | 8/1999 |
| DE | 19851469 | A1 | 5/2000 |
| DE | 60208002 | T2 | 8/2006 |
| DE | 102005050372 | A1 | 4/2007 |
| DE | 102008032378 | B3 | 12/2009 |
| DE | 102011018151 | A1 | 10/2012 |
| DE | 102013104437 | A1 | 10/2014 |
| DE | 102015109862 | A1 | 12/2016 |
| DE | 102016104780 | A1 | 9/2017 |

* cited by examiner

ARRANGEMENT FOR A VEHICLE ROOF, VEHICLE ROOF FOR A MOTOR VEHICLE, AND MOTOR VEHICLE

CROSS-REFERENCE TO RELATED APPLICATIONS

This application claims priority from German Patent Application Number DE 10 2017 119 329.4, filed Aug. 24, 2017, which is hereby incorporated herein by reference in its entirety for all purposes.

FIELD

Background

The invention relates to an arrangement for a vehicle roof, and to a vehicle roof for a motor vehicle, which arrangement and vehicle roof both contribute to increased safety for vehicle occupants of the motor vehicle. In addition, the invention relates to a motor vehicle with a vehicle roof and such an arrangement.

Some motor vehicles have vehicle roofs with a cover which is designed, for example, to be displaceable in order to open a roof opening. The cover here is raised, for example, into a ventilation position before it is displaced further to the rear in the opening direction into an open position. Such an arrangement which permits deployment and displacement of a cover is described, for example, in the document DE 102011018151 A1.

Covers or sliding roofs are generally configured in respect of their strength for loads which occur in the driving mode, such that they can withstand vibrations, wind loads, thermal length changes and distortions of existing mechanics. However, covers and sliding roofs are not designed to protect individuals, who are possibly not wearing their seatbelts, from falling through the associated roof opening during an accident, in particular if the motor vehicle overturns.

The invention is therefore based on the object of providing an arrangement for a vehicle roof and a corresponding vehicle roof for a motor vehicle, which arrangement and vehicle roof both contribute to increased safety for vehicle occupants of the motor vehicle.

The object is achieved by the features of the independent patent claim. Advantageous developments are specified in the dependent claims.

SUMMARY

An arrangement according to the invention for a vehicle roof comprises a roof element which can be coupled to a roof body of a motor vehicle and permits a view through the vehicle roof, and a safety device which is assigned to the roof element. The safety device has a safety element which is movable relative to the roof body, and a drive means which is configured to move the safety element and to transfer same from a first, retracted state, in which the safety element is stowed in a predetermined manner, into a second, extended state, in which the safety element covers a surface portion on a lower side of the roof element in a predetermined manner and opposes penetration of a body through the roof element. In this connection, furthermore, the safety device is designed as a darkening device and the safety element is designed as a darkening element in order to selectively reduce an entry of light through the roof element into the vehicle interior and to darken the vehicle interior in a predetermined manner.

The described arrangement makes it possible to realize a safety system for a motor vehicle, which contributes to increased safety for vehicle occupants of the motor vehicle. Such a safety system can also be arranged on existing vehicle roofs or in existing motor vehicles with a corresponding roof element, and therefore, by means of retrofitting with the arrangement, safety of the respective motor vehicle can be increased.

The described arrangement permits a darkening system for a motor vehicle, which is additionally designed in such a manner that, in the event of an accident of the motor vehicle, not only are the forces which result from the mass of the roof element, for example in the form of a sliding roof, itself taken into consideration provision of the embodiment in the form of a safety device also makes it possible to take into consideration forces which may originate from falling individuals who, during an accident, under some circumstances fall onto or against the roof element.

The described body which is intended to be protected against penetration through the roof element therefore represents in particular a human body with a corresponding mass which possibly acts on the roof element during an accident. In this connection, for example, forces which correspond to a weight having a mass of 200 kg or 500 kg or more occur depending on the speed. The described arrangement therefore makes it possible to realize vehicle roofs which, in addition to a convenient view through the roof element, are also configured to protect individuals who are not wearing seatbelts against falling through the roof element, for example in the event of the motor vehicle overturning.

The first state represents a state in which the safety element is stowed in a packed, rolled up or some other predetermined manner. In this first state, the safety element is preferably accommodated in a space-saving manner and does not cover any substantial region of the roof element. The second state represents a safety state in which the safety element is completely extended, spread out or unfolded such that a substantial region of the roof element is reliably and securely covered with the safety element. Between the first and the second state, the safety element can be used as a darkening element and can be moved step by step or continuously in order to provide desired shading of the vehicle interior.

Movement of the safety element can be carried out in particular independently of the roof element, which is realized, for example, as a sliding roof and is assigned to a roof opening in the vehicle roof. According to such a configuration, the safety device is not necessarily assigned to the movable roof element, but rather on the contrary to the roof opening, in order to contribute to increased safety of the motor vehicle. The described arrangement therefore also permits reliable protection for vehicle occupants of the motor vehicle against falling out through an opening of a sliding roof, irrespective of whether the vehicle roof is open and the roof opening is opened up or closed.

The arrangement therefore realizes a relatively simple and clear additional system or an extension of an existing darkening system for a vehicle roof and a motor vehicle, that contributes in particular to protection against falling out of the motor vehicle in the event of overturning. It is therefore not required to structurally reinforce a kinematic arrangement and construction of the vehicle roof in order to contribute to increased safety for vehicle occupants.

According to a preferred development of the arrangement, the safety device comprises a winding shaft and the safety element is designed as a roller blind which can be wound up and unwound and which is coupled to the winding shaft. Such a roller blind contains, for example, metal wires, carbon fibers and/or plastics fibers, which form a sufficient degree of strength for the safety element such that, in the event of an accident of the motor vehicle, penetration of a human body through the roof element can be reliably and securely opposed.

In this connection, the roller blind can be designed with regard to the material used or the employed blend of materials and/or in respect of the processing of the material in such a manner that it withstands a predetermined load value in order to be able to compensate for striking of a body thereagainst in the second state. In particular, during a configuration of the safety element and of the safety device, future legal regulations which, for example, define specifications for strength and load-bearing capacity for such a safety system are optionally taken into consideration.

The arrangement is configured in particular in such a manner that the safety device can be fixedly connected to the roof body of the motor vehicle in a form-fitting, force-fitting and/or integrally bonded manner. A secure and reliable support of the safety device on the motor vehicle can thereby be realized. For example, designated components of the safety device are adhesively bonded, screwed and/or welded to the roof body such that a particularly stable and secure support is formed. Alternatively or additionally, the safety device can be coupled to the roof body by means of riveting, pressing and/or further joining methods.

According to a preferred development of the arrangement, the safety device has a plurality of clamp-shaped carrier elements which each surround the winding shaft. The carrier elements are arranged along the elongate extent of the winding shaft and are designed in such a manner that they surround the winding shaft except for a gap. The gap is provided in such a manner that the roller blind can be wound up and unwound through the latter by the winding shaft, but the winding shaft cannot emerge through said gap. The carrier elements are manufactured, for example, from aluminum or steel and form a stable support for the rotatably mounted winding shaft.

According to a preferred development of the arrangement, the safety device has a first and a second crossmember, between which the safety element is arranged and clamped. The safety element is in each case coupled by a respective end to one of the crossmembers and, in the first state, is packed in a space-saving manner between them. In the second state, the two crossmembers are spaced apart further from each other such that the safety element is extended and tensioned. The first crossmember is preferably configured to be fixedly connected to the roof body of the motor vehicle in a form-fitting, force-fitting and/or integrally bonded manner in order to form a secure support of the safety device on the motor vehicle. The second crossmember is configured to be moved along the lower side of the roof element by means of the drive means and to unwind or spread out the roller blind or the safety element.

According to a further preferred development of the arrangement, the drive means comprises a drive cable and a first motor unit, wherein the drive cable is coupled firstly to the safety element and secondly to the first motor unit. The first motor unit is configured to provide a first speed stage with a first speed and a second speed stage with a second speed for moving the drive cable and moving the safety element, wherein the first speed stage is provided for darkening the vehicle interior and the second speed stage is provided for forming the second state of the safety element.

The first motor unit can be realized, for example, as an electric motor, to which a first voltage is applied or which is operated with a first current in order to set the first speed stage and to operate the safety element as a darkening element. By means of application of a second voltage or a second current, which are significantly higher than the first voltage or the first current, the safety element can be substantially more rapidly moved and can promptly cover a lower side of the roof element or of the roof opening. For example, the first speed stage is configured in such a manner that the safety element can be moved one meter within five seconds by means of the first motor unit. The second speed stage is then predetermined, for example, in such a manner that, by means of the first motor unit, the roof element can be covered by the safety element or, in accordance with an embodiment of a displaceable roof element, the roof opening can be covered, for example, within a few milliseconds.

According to a particularly preferred development of the arrangement, the drive means comprises a second motor unit for forming the second speed stage, a gas line for conducting gas and a gas unit for providing and releasing gas, wherein the second motor unit is coupled firstly to the first motor unit and secondly to the gas line. The gas line is furthermore coupled to the gas unit such that, by release of gas by means of the gas unit, the second motor unit can be operated and the second speed stage of the first motor unit can thereby be formed.

By release of gas by means of the gas unit, the safety element can be abruptly moved from the first state into the second state and, in the event of an accident, can be spread out promptly and reliably under the roof element or the roof opening. The gas unit can comprise, for example, a gas container which is filled with compressed gas or a gas mixture which, in the event of an accident of the motor vehicle, is released and fed into the gas line for driving the second motor unit. The second motor unit in turn drives the first motor unit at an increased speed, and therefore the safety element which is coupled thereto can be moved substantially more rapidly.

Alternatively or additionally, the gas unit can have a pyrotechnic gas generator which, by priming by means of a primer, provides a gas or gas mixture for moving the safety element in the event of an accident. The drive means preferably comprises one or more gas valves which can realize a respective throttle function and can permit a controlled gas flow and can contribute to a safe spreading out of the safety element. The second motor unit therefore realizes a compressed air motor which, in the event of an accident of the motor vehicle, is switched on together with the first motor unit. The first motor unit is designed in particular as an electric motor.

According to a particularly preferred development of the arrangement, the safety device has a receiving unit which comprises a crossmember and one or more fixing elements which are designed to secure the safety element in the second, extended state. This makes it possible to realize a more stable and safer second state of the safety element in which the safety element is extended or spread out and forms a reliable support for a body striking thereagainst such that penetration through the roof element is prevented or penetration is at least opposed.

The roof element of the arrangement is designed, for example, as a glass and/or plastics skin which is fixedly installed in the vehicle roof of the motor vehicle. It permits a view through the vehicle roof within the range of the light spectrum perceptible by people and is customarily not configured in respect of its strength to withstand an impact of a human body. By means of the described arrangement, penetration of a body through such a glass and/or plastics skin can be reliably and safely prevented or such a penetration can be at least opposed.

Alternatively, the roof element is designed as a displaceable cover which is movable relative to the safety device and the roof body in order selectively to close or to open up a roof opening in the vehicle roof. Both when the cover is open and when the cover is closed, the safety device contributes to the safety of vehicle occupants of the motor vehicle, by, in the event of an accident, covering the associated roof opening in the vehicle roof and, when a cover is opened, opposing falling of a body through the roof opening.

A vehicle roof according to the invention for a motor vehicle comprises a configuration of the previously described arrangement which is arranged in or on the vehicle roof. The arrangement is arranged in particular on a lower side of the vehicle roof, which lower side faces the vehicle interior in an operationally ready state of an associated motor vehicle. The vehicle roof also comprises, for example, frame parts and/or body elements which, as connection components, permit the vehicle roof to be attached to a roof body of the motor vehicle. Owing to the fact that the vehicle roof comprises one of the previously described configurations of the arrangement, described properties and features of the arrangement, to the extent relevant, are also disclosed for the vehicle roof, and vice-versa.

A motor vehicle according to the invention comprises a vehicle roof and a configuration of the previously described arrangement which is coupled to a roof body of the motor vehicle. Owing to the fact that the motor vehicle comprises one of the previously described configurations of the arrangement, described properties and features of the arrangement, to the extent relevant, are also disclosed for the motor vehicle, and vice-versa.

BRIEF DESCRIPTIONS OF THE DRAWING

Exemplary embodiments of the invention are explained in more detail below with reference to the schematic drawings, in which.

DETAILED DESCRIPTION

Elements of identical design or function are indicated by the same reference signs throughout the figures. For clarity reasons, it is possible that not all of the illustrated elements in all of the figures are indicated by associated reference signs.

Figure 1:
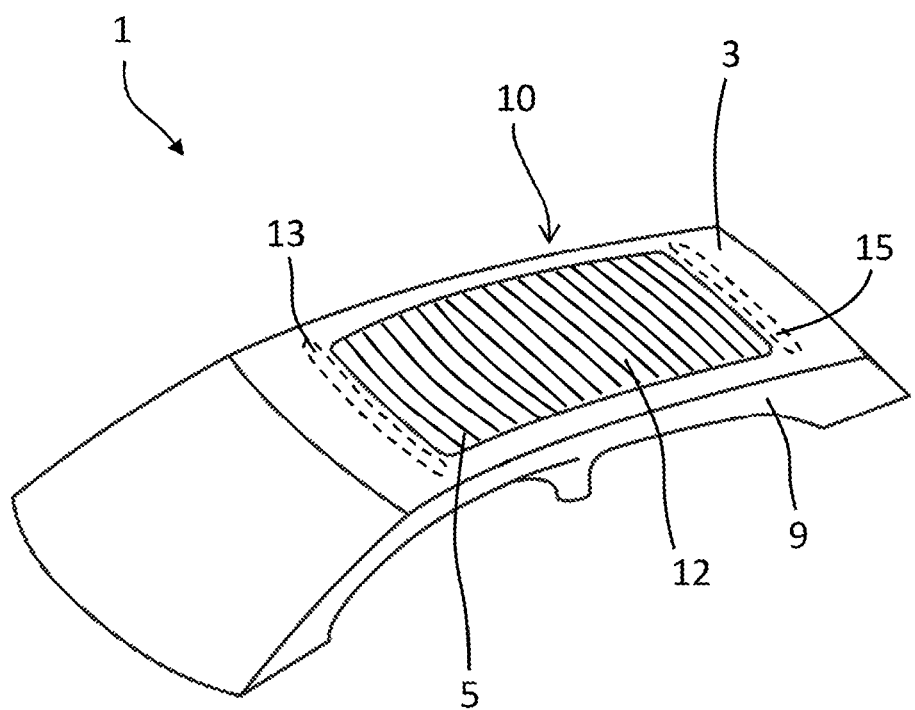
FIG. 1 shows a vehicle roof of a motor vehicle in a perspective view.

FIG. 1 shows schematically in a perspective view a motor vehicle 1 with a vehicle roof 3 which has a roof element 5. The roof element 5 is fixedly connected to a roof body 9 of the motor vehicle 1, for example by means of frame parts or coupling means, and realizes, for example, a fixed glass or fixed plastics element which is immovable with respect to the vehicle roof 3. Alternatively, the roof element 5 is configured as a movable cover which is movable relative to the vehicle roof 3 in order to selectively open up or to close a roof opening in the vehicle roof 3. The roof element 5 in particular realizes a component which permits a view through the vehicle roof 3 of the motor vehicle 1.

The motor vehicle 1 furthermore has an arrangement 10 which is arranged on a lower side of the vehicle roof 3, which lower side faces the vehicle interior. As will be explained with reference to FIGS. 2 and 3 below, the arrangement 10 contributes to increased safety for vehicle occupants of the motor vehicle 1 and, in the event of an overturning, opposes falling out through the roof element 5 or through the roof opening in the vehicle roof 3.

The arrangement 10 comprises a safety device which is assigned to the roof element 5 and/or, with regard to a movable cover or a sliding roof, to the roof opening. The safety device has a safety element 12 which is movable relative to the roof body 9, and a drive means 20 which is configured to move the safety element 12 and to transfer same from a first, retracted state, in which the safety element 12 is stowed in a predetermined manner, into a second, extended state, in which the safety element 12 covers a surface portion on a lower side of the roof element 5 in a predetermined manner and opposes penetration of a body through the roof element 5 or through the opened-up roof opening. Furthermore, the safety device is designed as a darkening device and the safety element 12 is designed as a darkening element in order to selectively reduce an entry of light through the roof element 5 or through the opened-up roof opening into the vehicle interior and to darken the vehicle interior.

The first state represents a state in which the safety element 12 is stowed in a packed, rolled up or some other predetermined manner. In this first state, the safety element 12 is preferably accommodated in a space-saving manner, for example in a front region of the motor vehicle 1 above the windshield, and does not cover a substantial region of the roof element 5. The second state represents a safety state in which the safety element 12 is completely extended, spread out or unfolded, and therefore a substantial region of the roof element 5 or of the roof opening is reliably and safely covered with the safety element 12. Between the first and the second state, the safety element 12 can be used as a darkening element and can be moved step by step or continuously in order to set a desired shading of the vehicle interior.

FIG. 1 illustrates the second state of the safety element 12 which is designed as a roller blind which contains, for example, metal wires, carbon fibers and/or plastics fibers which realize a sufficient degree of strength of the safety element 12 such that, during an accident of the motor vehicle 1, penetration of a human body through the roof element 5 or through the roof opening is reliably and securely opposed. According to an alternative embodiment of the arrangement 10, the safety element 12 is designed as a sliding roof lining.

The safety element 12 is designed with respect to the material used or the processed blend of materials in such a manner that it withstands a predetermined load value in order, in the second state, to be able to compensate for striking of a body thereagainst without said body penetrating the roller blind or the safety element 12. The described arrangement 10 therefore also takes into consideration forces which may emanate from falling individuals who under some circumstances in the event of an accident fall onto or against the roof element 5 or in the direction of the roof opening. In this connection, forces which correspond to a weight having a mass of 200 kg or 500 kg or more can act on the safety element 12.

Figure 2:
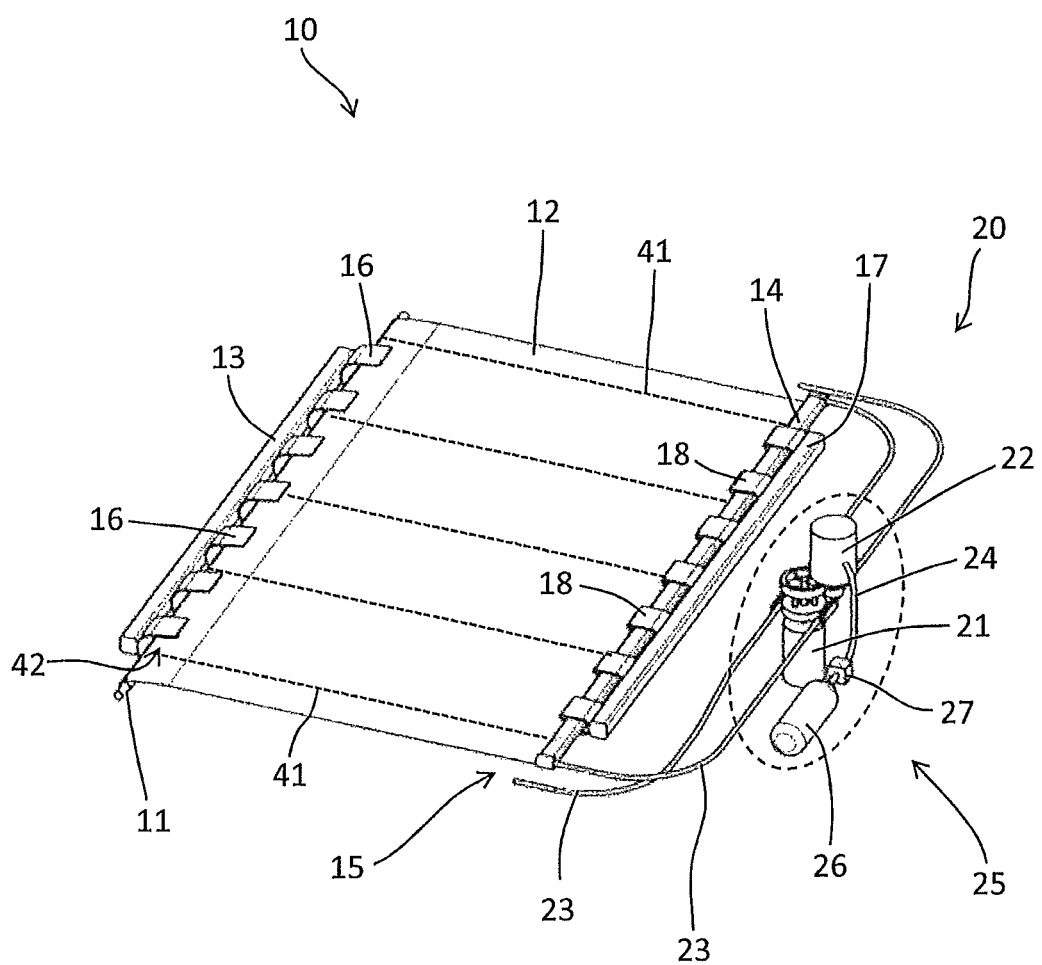
FIG. 2 shows an exemplary embodiment of an arrangement for a vehicle roof.

FIG. 2 shows schematically in a perspective view an exemplary embodiment of the arrangement 10 or of the safety device with the safety element 12 in an embodiment of a roller blind which, in the illustrated exemplary embodiment, is arranged unrolled and spread out between a first crossmember 13 and a second crossmember 14. Accordingly, FIG. 2 shows the second state of the safety element 12, in which the latter is completely spread out and fixed.

The safety element 12 is in each case coupled by a respective end to one of the crossmembers 13, 14. The first crossmember 13 is fixedly connected to the vehicle roof 3 and/or to the roof body 9 of the motor vehicle 1 in a form-fitting, force-fitting and/or integrally bonded manner in order to form a secure support of the safety device on the motor vehicle 1. The second crossmember 14 is configured to be moved along the lower side of the roof element 5 or of the vehicle roof 3 by means of a drive means 20 and to unroll or to unwind or to spread out the safety element 12.

The arrangement 10 comprises a winding shaft 11 to which the safety element 12 is coupled as a roller blind which can be wound up and unwound. Such a roller blind contains, for example, metal wires, carbon fibers and/or plastics fibers 41 (FIG. 2), which form a sufficient degree of strength for the safety element such that, in the event of an accident of the motor vehicle 1 penetration of a human body through the roof element 5 or through a roof opening in the vehicle roof 3 can be reliably and securely opposed.

The safety device furthermore has a plurality of clamp-like carrier elements 16 which each surround the winding shaft 11. The carrier elements 16 are arranged along the elongate extent of the winding shaft 11 and are designed in such a manner that they surround the winding shaft 11 except for a gap 42. Gap 42 is provided in such a manner that the roller blind can be wound up and unwound from the winding shaft 11 through said gap 42, but the winding shaft 11 cannot emerge through said gap 42. The carrier elements 16 are manufactured, for example, from aluminum or steel and form a stable support for the rotatably mounted winding shaft 11.

The carrier elements 16 are connected, for example, fixedly to the first crossmember 13 and thereby supply a stable and secure support for the winding shaft 11 and the safety element 12. Alternatively or additionally, the carrier elements 16 can be connected to the vehicle roof 3 or to the roof body 9 of the motor vehicle 1 in a force-fitting, form-fitting and/or integrally bonded manner in order to form a stable support such that, according to such an alternative embodiment, the first crossmember 13 could be omitted and a construction of the arrangement 10 which still saves space would be able to be realized.

The drive means 20 comprises a first motor unit 21, a second motor unit 22, two drive cables 23 and a gas unit 25 for providing and releasing gas, and a gas line for conducting gas. The drive cables 23 are each connected at one end to the second crossmember 14 and are coupled to the safety element 12 and are coupled at the other end to the first motor unit 21 which permits a movement of the safety element 12. The second motor unit 22 is coupled firstly to the first motor unit 21 and secondly by the gas line 24 to the gas unit 25. By release of gas by means of the gas unit 25, the second motor unit 22 can be operated as a compressed air motor such that the latter in connection with the first motor unit 21 permits a particularly rapid movement of the safety element 12 from the first state or a partially unrolled state into the second state in order, in the event of an accident, to spread open the safety element 12 promptly and reliably under the roof element 5 or the roof opening as protection for vehicle occupants.

The first motor unit 21 is designed, for example, to provide a first speed step for moving the safety element 12 as a darkening element. The second motor unit 22 is designed to provide a second speed step for moving the safety element 12 for protecting vehicle occupants. A second speed, which is associated with the second speed step, for moving the safety element 12 is significantly greater than a first speed of the first speed step, which is coordinated, for example, with a pleasantly perceived operation of the safety device as a darkening device.

The gas unit 25 can comprise, for example, a gas container 26 which is filled with compressed gas or gas mixture which is released in the event of an accident of the motor vehicle 1 and fed into one or more gas lines 24 and is conveyed to the second motor unit 22. Alternatively or additionally, the gas unit 25 can have a pyrotechnic gas generator 26 which by priming by means of a primer in the event of an accident provides a gas or gas mixture for moving the safety element 12 and is fed into the gas line 24. The second motor unit drives the first motor unit 21 alternatively or additionally to its own operation, and therefore the second speed step can be realized with a substantially increased second speed in comparison to the first speed.

The drive means 20 furthermore comprises a gas valve 27 by means of which a throttle function can be realized and a controlled gas flow to the second motor unit 22 is possible in order to permit secure spreading out of the safety element 12.

Furthermore, the safety device has a receiving unit 15 which comprises a crossmember 17 and a plurality of clamp-shaped fixing elements 18 which are arranged on the crossmember 17. The fixing elements 18 are designed to secure the safety element 12 in a stable and reliable manner in the second, extended state in order to form a reliable support for a body striking against the safety element 12. For this purpose, the crossmember 17 and the fixing elements 18 are arranged opposite the first crossmember 13 in the region of an axial end of the cylinder 22 and are designed in a manner coordinated with an extended position of the safety element 12.

The crossmember 17 of the receiving unit 15 is connected, for example, like the first crossmember 13, to the vehicle roof 3 or to the roof body 9 of the motor vehicle 1 in a force-fitting, form-fitting and/or integrally bonded manner in order to form a reliable and stable support of the safety device. Alternatively or additionally, the fixing elements 18, like the previously described carrier elements 16, can be connected to the vehicle roof 3 or to the roof body 9 of the motor vehicle 1 in a force-fitting, form-fitting and/or integrally bonded manner in order to form a stable support such that, according to such an alternative embodiment, the crossmember 17 of the receiving unit 15 could be omitted and a construction of the arrangement 10 that is still space-saving would be able to be realized.

By means of the arrangement 10, a rapidly closing roller blind can be realized for the vehicle roof 3, said roller blind also contributing to protection of individuals against falling out of the motor vehicle 1 in the event of the latter overturning. The arrangement 10 in a configuration with a roller blind as the safety element 12 and with a displaceable cover or sliding roof, which is provided for closing and opening up an associated opening in the vehicle roof, is described below.

The roller blind is wound up on the rotatably mounted winding shaft 11 and held under tension by spring force which acts on the winding shaft. The winding of the roller blind about the winding shaft 11 is additionally held in the clamp-shaped carrier elements 16 which surround the winding and only have a gap to the rear (in the direction of the receiving unit 15) through which the roller blind material can emerge, but which is smaller than a radial size of the winding shaft 11, and therefore the winding shaft 11 cannot pass together with the material out of the carrier elements 16. The carrier elements 16 are fastened to a first crossmember 13 which is mounted directly in or on the vehicle roof 3. Alternatively, the carrier elements 16 are mounted directly in or on the vehicle roof 3. The forces which act on the material of the roller blind in the event of a vehicle occupant falling thereagainst can therefore be conducted via the carrier elements into the body of the motor vehicle 1 since the winding shaft per se customarily does not have a required flexural strength in order to withstand forces of a human body striking thereagainst.

In a closed state of the roller blind, the second crossbow or crossmember 14 stops shortly before the clamp-shaped receiving elements 18 which can receive it. A few windings of roller blind material are still wound up on the winding shaft 11.

The crossmember 17 of the receiving unit 15 is located at the rear end of the vehicle roof 3, said crossmember being fixedly connected to the vehicle roof 3 and being located shortly behind the end position of the second crossmember 14 with respect to a position in the second state of the safety element 12 with the roller blind tensioned. A plurality of C-shaped fixing elements 18 are attached to said crossmember 17 and can receive the second crossmember 14 in its end position when the roller blind is tensioned. Said fixing elements 18 preferably contain a latching mechanism and insertion slopes so that the second crossmember 14 can pass into the interior of the respective C-shaped clips or the respective fixing elements 18 even in the event of a slightly eccentric approach.

A latching mechanism of the respective fixing elements 18 can be designed, for example, in the form of barbs with a wedge-shaped run-on slope, by means of which said barbs can be bent to the side by the approaching second crossmember 14, or the respective fixing element 18 can be bent up to an extent sufficient such that the second crossmember 14 can pass into the respective fixing element 18. After such an end position, which lies behind the end position for a darkening normal operation, is reached in the event of an accident, the barb or the respective fixing element 18 springs back and forms a steep rear edge which blocks the path out of the fixing element 18 for the second crossmember 14. Alternatively or additionally, a latching mechanism can be formed by means of a spring-loaded pin or bolt. The fixing elements 18 are manufactured, for example, from aluminum or steel in order to permit a secure and reliable support of the roller blind in the second state. During the subsequent striking of objects or a human body against the roller blind, the first crossmember 13 and the crossmember 17 of the receiving unit 15 will thereby conduct the arising forces into the body of the motor vehicle 1 such that further elements of the kinematic arrangement are relieved of load. In this second end position, the roller blind material is completely unwound from the winding shaft and is tensioned between winding shaft 11 and crossmember 17 of the receiving unit 15. A size of the roller blind or of the safety element 12 is coordinated in particular with the second state and the end position within the fixing elements 18. Alternatively, if the roller blind material due to the design has not yet been completely unwound from the winding shaft 11, the safety device could have a locking mechanism which secures the winding shaft 11 in said end position against further rotation.

The roller blind is optionally spread out in the transverse direction between two lateral guide rails such that an absorption of forces via the first crossmember 13 and the crossmember 17 of the receiving unit 15 in the longitudinal direction is not absolutely necessary. However, the span of the roller blind material in the transverse direction is customarily greater than in the longitudinal direction (with respect to a vehicle longitudinal axis of an operationally ready motor vehicle 1). Since, for this reason, in the event of loading of the roller blind material, tensions in the roller blind during transmission in the transverse direction are greater than during transmission in the longitudinal direction, the absorption of force in the longitudinal direction is advantageous.

Figure 3:
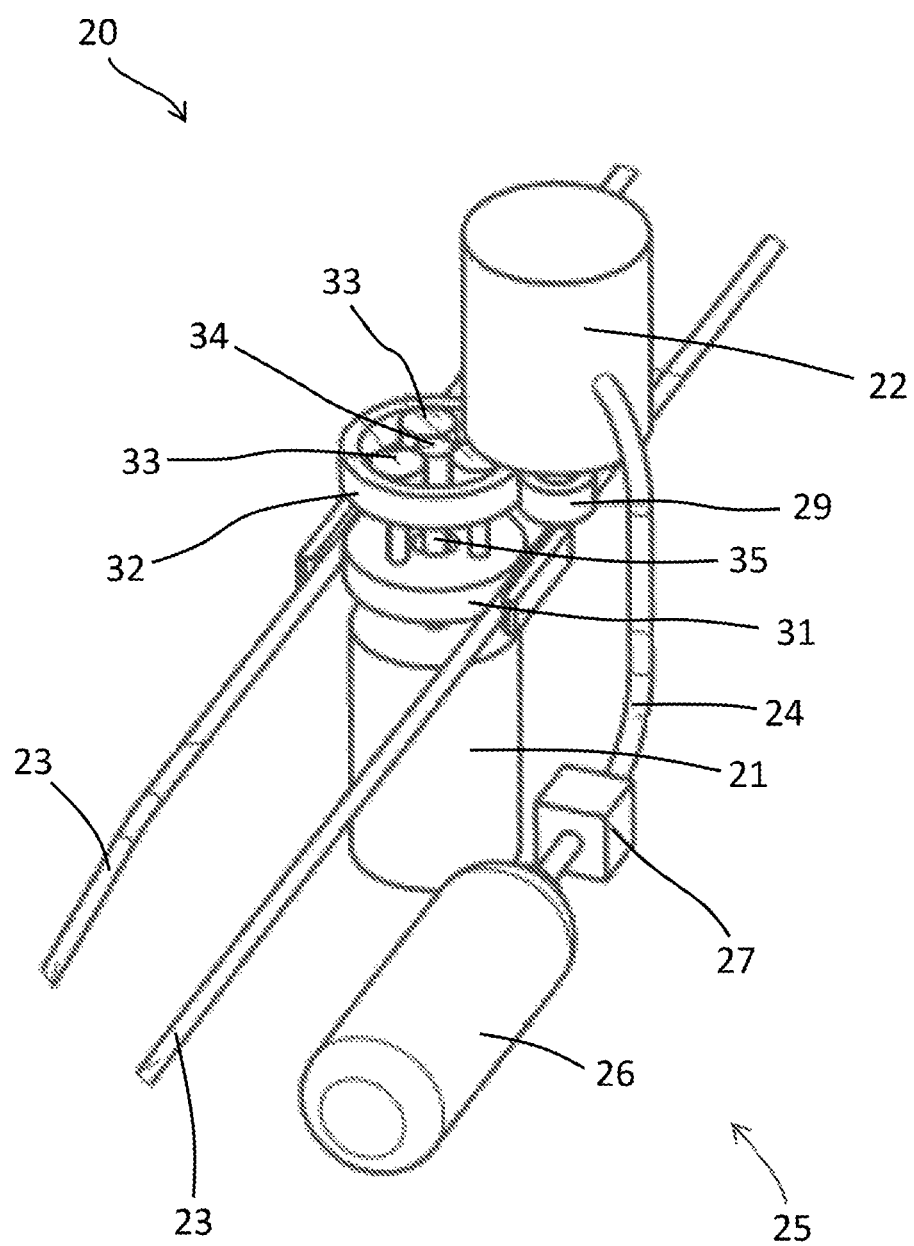
FIG. 3 shows an exemplary embodiment of a first and second motor unit of the arrangement for a vehicle roof.

FIG. 3 illustrates the region, shown in FIG. 2 by dashed lines, in an enlarged perspective illustration. The roller blind is first of all driven via two drive cables 23 which are assigned to a left and a right side of the roller blind with respect to the longitudinal direction. The drive cables 23 are driven by the first motor unit 21 via a gear wheel mechanism with a drive pinion 31. In a coupling with the second motor unit 22, the first motor unit 21 has a step-down gearing with a ring gear 32, a sun gear 34 extending into the ring gear 32 and three planetary gears 33 which are arranged between the ring gear 32 and the sun gear 34 and, in interaction, realize a planetary gearing as a type of differential gearing.

The first motor unit 21 drives the sun gear 34 directly via a motor shaft 35. The drive gear wheel or drive pinion 31 for the drive cable 23 is at the same time a planet carrier for planetary gears 33. The ring gear 32 is mounted rotatably in a gearing housing (not illustrated in FIG. 3). In interaction with the gas unit 25, the second motor unit 22 realizes a compressed air motor and drives the ring gear 32 via a drive pinion 29. When the second motor unit 22, which is generally provided only for an accident situation, is switched on, the drive cables 23 are driven at a substantially higher speed than when they are driven by the first motor unit 21, wherein, via the planetary gearing, the two motor units 21 and 22 can drive the roller blind independently or, upon simultaneous actuation, in a combined manner by means of the planetary gearing.

In the event of an accident, the compressed air motor or the second motor unit is fed with compressed gas from a compressed gas or compressed air cylinder 26 or a pyrotechnic gas generator 26 via the gas line 24. Either the compressed air cylinder 26 is connected here to the second motor unit 22 by an electrically controlled gas valve 27 or, according to an embodiment with a pyrotechnic gas generator 26, by priming of a pyrotechnic charge.

Alternatively, other drives for actuating the sun gear 34 are also possible, such as, for example, a further electric motor or a spring drive. It is also possible to provide the use of a single motor via a cylindrical gearing wherein the single motor is operated at a higher speed or is acted upon with a higher voltage or current.

The described arrangement 10 makes it possible to realize a safety system for a motor vehicle 1, which contributes to increased safety for vehicle occupants of the motor vehicle 1. Such a safety system can also be arranged on existing vehicle roofs or in existing motor vehicles with a corresponding roof element 5, and therefore, by means of retrofitting with the arrangement 10, safety of the respective motor vehicle can be increased.

LIST OF REFERENCE SIGNS

1 Motor vehicle
3 Vehicle roof
5 Roof element
9 Roof body
10 Arrangement

11 Winding shaft
12 Safety element/roller blind
13 First crossmember
14 Second crossmember
15 Receiving unit
16 Carrier element
17 Crossmember of the receiving unit
18 Fixing elements of the receiving unit
20 Drive means
21 First motor unit
22 Second motor unit
23 Drive cable
24 Gas line
25 Gas unit
26 Gas container/gas generator
27 Gas valve/throttle
29 Drive pinion
31 Drive pinion
32 Ring gear
33 Planetary gears
34 Sun gear
35 Motor shaft

The invention claimed is:

1. An arrangement for a vehicle roof, comprising:
a roof element which can be coupled to a roof body of a motor vehicle and permits a view through the vehicle roof, and
a safety device which is assigned to the roof element and which has a safety element which is designed to oppose penetration of a body through the roof element, wherein the safety device furthermore has a drive means which is configured to move the safety element relative to the roof body and to transfer same from a first, retracted state, in which the safety element is stowed in a predetermined manner, into a second, extended state, in which the safety element covers a surface portion on a lower side of the roof element, wherein the safety device is furthermore designed as a darkening device and the safety element is designed as a darkening element, in order to selectively darken a vehicle interior of the motor vehicle;
wherein in which the drive means comprises a drive cable and a first motor unit, wherein the drive cable is coupled firstly to the safety element and secondly to the first motor unit, and wherein the first motor unit is configured to provide a first speed stage with a first speed and a second speed stage with a second speed for moving the drive cable and moving the safety element, wherein the first speed stage is provided for darkening the vehicle interior by means of the safety element and the second speed stage is provided for forming the second state of the safety element; and
wherein in which the drive means comprises a second motor unit, a gas line for conducting gas and a gas unit for providing and releasing gas, wherein the second motor unit is coupled firstly to the first motor unit and secondly to the gas line, and wherein the gas line is coupled to the gas unit such that, by release of gas by means of the gas unit, the second motor unit can be being operated and the second speed stage of the first motor unit can is thereby be formed.

2. The arrangement according to claim 1, wherein in which the safety device comprises a winding shaft and the safety element is designed as a roller blind which can be wound up and unwound and is coupled to the winding shaft.

3. The arrangement according to claim 2, wherein in which the roller blind contains metal wires, carbon fibers, and/or plastics fibers or combinations thereof.

4. The arrangement according to claim 2, wherein in which the safety device has a plurality of clamp-shaped carrier elements which each surround the winding shaft, and wherein the carrier elements each have a gap which is designed in such a manner that the roller blind can be wound up and unwound through the respective gap and the winding shaft is prevented from emerging out of the carrier elements through the respective gap.

5. The arrangement according to claim 1, wherein in which the safety device has a first cross-member and a second cross-member, between which the safety element is arranged and is in each case coupled by a respective end to one of the cross-members, and wherein the first cross-member is configured to be fixedly connected to the roof body of the motor vehicle in a form-fitting, force-fitting, and/or integrally bonded manner or combinations thereof, and the second cross-member is configured to be moved along the lower side of the roof element by means of the drive means.

6. The arrangement according to claim 1, wherein in which the gas unit comprises a gas container with compressed gas, and/or a pyrotechnic gas generator, or a combination thereof.

7. The arrangement according to claim 1, wherein in which the safety device has a receiving unit which comprises a cross-member and one or more fixing elements which are designed to secure the safety element in the second, extended state.

8. The arrangement according to claim 1, wherein in which the roof element is designed as a fixedly installed glass, and/or plastics skin, or a combination thereof, or is designed as a displaceable cover which is movable relative to the safety device in order to selectively close or open up a roof opening in the vehicle roof.

9. A motor vehicle, comprising:
a vehicle roof, and
an arrangement according to claim 1 which is coupled to a roof body of the motor vehicle.

* * * * *